US012654207B2

(12) United States Patent
Furuta

(10) Patent No.: US 12,654,207 B2
(45) Date of Patent: Jun. 16, 2026

(54) WORKPIECE CLEANING METHOD AND CLEANING DEVICE

(71) Applicant: NHK SPRING CO., LTD., Yokohama (JP)

(72) Inventor: Eijiro Furuta, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 29 days.

(21) Appl. No.: 18/409,632

(22) Filed: Jan. 10, 2024

(65) Prior Publication Data

US 2024/0286174 A1 Aug. 29, 2024

(30) Foreign Application Priority Data

Feb. 24, 2023 (JP) ................................ 2023-027433

(51) Int. Cl.
*B08B 3/12* (2006.01)

(52) U.S. Cl.
CPC ..................................... *B08B 3/12* (2013.01)

(58) Field of Classification Search
CPC ....................................................... B08B 3/12
See application file for complete search history.

(56) References Cited

U.S. PATENT DOCUMENTS 5,025,187 A 6/1991 Fujie et al.
5,911,232 A * 6/1999 Mokuo ............ H01L 21/67057 310/317
6,017,398 A * 1/2000 Scotto ....................... B08B 3/12 134/1
6,840,250 B2 * 1/2005 Kashkoush ....... H01L 21/67057 134/186
2004/0114279 A1 * 6/2004 Kuwajima ........... G11B 5/5552
2005/0237661 A1 10/2005 Blake et al.
2007/0144263 A1 * 6/2007 Fei ..................... G01N 29/4463 73/644
2007/0182285 A1 * 8/2007 Goodson ........... H01L 21/67057 310/334
2008/0094758 A1 * 4/2008 Liao ....................... G11B 5/596 360/294.4
2011/0079253 A1 * 4/2011 Hasegawa ................. B08B 3/12 134/184
2011/0132398 A1 * 6/2011 Barrett .................. G01F 1/6983 310/317

(Continued)

FOREIGN PATENT DOCUMENTS

CA 3215652 A1 * 11/2022 ............... B08B 3/12
CN 103700377 A 4/2014

(Continued)

OTHER PUBLICATIONS

Chinese Office Action (and an English language translation thereof) dated Jan. 20, 2026, issued in corresponding Chinese Application No. 202410182825.3.

*Primary Examiner* — Sharidan Carrillo
(74) *Attorney, Agent, or Firm* — Holtz, Holtz & Volek PC

(57) ABSTRACT

According to one embodiment, a cleaning method for cleaning a workpiece including a first vibrating body includes electrically connecting the first vibrating body with a controller, immersing the workpiece in a cleaning solution, and cleaning the workpiece by causing the first vibrating body to vibrate by the controller after immersing the workpiece in the cleaning solution.

5 Claims, 6 Drawing Sheets

(56) References Cited

U.S. PATENT DOCUMENTS

| | | | | |
|---|---|---|---|---|
| 2012/0058258 | A1* | 3/2012 | Ye | B08B 3/12 427/127 |
| 2014/0085754 | A1 | 3/2014 | Hanya et al. | |
| 2014/0261557 | A1* | 9/2014 | Sotoku | B05B 15/555 134/104.1 |
| 2021/0249040 | A1* | 8/2021 | Hahn | G11B 5/4833 |
| 2024/0286174 | A1* | 8/2024 | Furuta | B08B 3/12 |
| 2024/0355359 | A1* | 10/2024 | Furuta | B08B 5/02 |

FOREIGN PATENT DOCUMENTS

| | | | | | |
|---|---|---|---|---|---|
| GB | 2623127 | A | * | 4/2024 | B63B 59/04 |
| JP | H0864566 | A | | 3/1996 | |
| JP | 2006116403 | A | | 5/2006 | |
| WO | WO-2005098847 | A2 | * | 10/2005 | G11B 5/3173 |

* cited by examiner

WORKPIECE CLEANING METHOD AND CLEANING DEVICE

CROSS-REFERENCE TO RELATED APPLICATIONS

This application is based upon and claims the benefit of priority from prior Japanese Patent Application No. 2023-027433, filed Feb. 24, 2023, the entire contents of which are incorporated herein by reference.

BACKGROUND OF THE INVENTION

1. Field of the Invention

The present invention relates to a workpiece cleaning method and a cleaning device.

2. Description of the Related Art

A hard disk drive (HDD) is used in an information processing apparatus such as a personal computer. The hard disk drive comprises a magnetic disk which rotates about a spindle, a carriage which turns about a pivot, and the like. A disk drive suspension (hereinafter simply referred to as a suspension) is provided on an arm of the carriage.

The suspension includes a load beam, a flexure stacked on the load beam, and the like. A slider, which constitutes a magnetic head, is mounted on a gimbal portion formed near the distal end of the flexure.

The slider is provided with an element (transducer) for accessing data, that is, for reading or writing data. A head gimbal assembly is constituted by the load beam, the flexure, the slider, and the like.

In order to respond to the increase in the recording density of the disks, the suspension is further downsized with higher accuracy. When small components such as the suspension are cleaned, batch cleaning is used such that a plurality of components are placed in a cleaning tank and cleaned together.

For example, JP 2006-116403 A discloses a cleaning retainer that holds at least one cleaning object and is immersed in a cleaning tank. This cleaning retainer is characterized by comprising a tray in which the cleaning object is arranged, a surrounding member erected on a cleaning object arrangement surface of the tray and surround the cleaned object, and a release restricting member that restricts the cleaned object from being separated and released from the tray, and characterized in that an opening portion which causes a solvent used for cleaning the cleaned object to flow in and out is formed around the cleaned object surrounded by the surrounding member.

Even if JP 2006-116403 A is considered, there is still room for various improvements in the cleaning of workpieces.

BRIEF SUMMARY OF THE INVENTION

Embodiments described herein aim to provide a workpiece cleaning method and a cleaning device capable of improving the quality of cleaning.

In general, according to one embodiment, there is provided a cleaning method for cleaning a workpiece, comprising a first vibrating body. The method comprises electrically connecting the first vibrating body with a controller, immersing the workpiece in a cleaning solution, and cleaning the workpiece by causing the first vibrating body to vibrate by the controller after immersing the workpiece in the cleaning solution.

The cleaning method may further comprises holding the plurality of workpieces with holding members. The cleaning method may further comprises cleaning the workpiece by causing a second vibrating body provided in a cleaning tank to vibrate after immersing the workpiece in the cleaning solution. The first vibrating body and the second vibrating body may be caused to vibrate simultaneously to clean the workpiece. A vibration frequency of the first vibrating body may be different from a vibration frequency of the second vibrating body.

The cleaning method may further comprise attaching the first vibrating body to the workpiece. The first vibrating body may be electrically connected to the controller after attaching the first vibrating body to the workpiece.

The workpiece may be a disk drive suspension. The first vibrating body may be a piezoelectric element provided on the disk drive suspension. The disk drive suspension may further comprise a base plate, a load beam connected to the base plate, and a flexure provided along the load beam.

The flexure may include a tail portion including a wiring terminal electrically connected to the controller, and a distal end portion on which a slider is mounted. The distal end portion may be located below the tail portion in a state in which the disk drive suspension is immersed in the cleaning solution.

According to another embodiment, there is a cleaning device for cleaning a workpiece, comprising a first vibrating body. The cleaning device comprises a cleaning tank in which a cleaning solution is contained, and a controller electrically connected to the first vibrating body and causing the workpiece to vibrate in a state in which the workpiece is immersed in the cleaning solution.

The cleaning device may further comprise a holding member holding the plurality of workpieces, and a connecting member electrically connecting the controller with the first vibrating body. The cleaning device may further comprise a second vibrating element provided in the cleaning tank to cause the workpiece to vibrate in a state in which the workpiece is immersed in the cleaning solution.

The workpiece may be a disk drive suspension. The first vibrating body may be a piezoelectric element provided on the disk drive suspension.

According to the workpiece cleaning method and the cleaning device configured as described above, the quality of cleaning can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
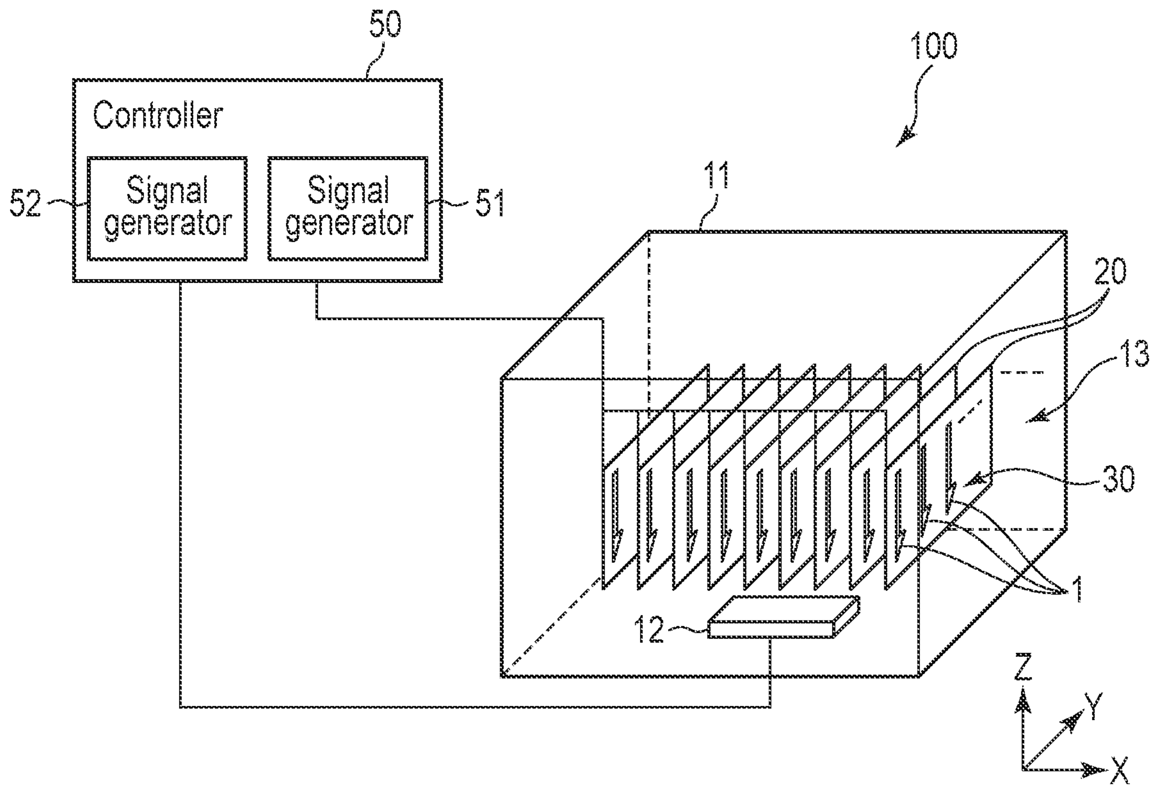
FIG. 1 is a schematic perspective view showing a cleaning device according to an embodiment.

An embodiment of the invention will be described hereinafter with reference to the accompanying drawings. In order to make the description clearer, the sizes, shapes and the like of the respective parts may be changed and illustrated schematically in the drawings as compared with those in an accurate representation.

In the figures, an X-axis, a Y-axis and a Z-axis orthogonal to each other are described to facilitate understanding as needed. A direction along the X-axis is referred to as a direction X, a direction along the Y-axis is referred to as a direction Y, and a direction along the Z-axis is referred to as a direction Z. In addition, the direction Z may also be referred to as an upper or upward direction, and the direction opposite to the direction Z may be referred to as a lower or downward direction. The direction Z is a normal to a plane including the direction X and the direction Y.

FIG. 1 is a schematic perspective view showing a cleaning device 100 according to an embodiment. The cleaning device 100 is a device for cleaning a workpiece 1 comprising a first vibrating body 30. In this case, the workpiece 1 is an example of a cleaned member which is to be cleaned by the cleaning device 100. In the present embodiment, a cleaning device that can be applied to a process of manufacturing the disk drive suspension will be exemplified.

The cleaning device 100 comprises a cleaning tank 11, a second vibrating body 12, a plurality of holding members 20, and a controller 50. The cleaning tank 11 contains a cleaning solution 13. The cleaning solution 13 is, for example, pure water, ion-exchanged water, or the like.

The holding member 20 holds at least one workpiece 1. The holding member 20 holds, for example, a plurality of workpieces 1. The plurality of holding members 20 are aligned in the direction X inside the cleaning tank 11, in the example shown in FIG. 1. In other words, the workpieces 1 are sandwiched between the holding members 20 adjacent in the direction X.

The plurality of holding members 20 may be aligned in the direction Y. The plurality of holding members 20 are positioned at predetermined positions in the cleaning tank 11 by, for example, a frame (not shown) or the like. The workpiece 1 comprises the first vibrating body 30.

The second vibrating body 12 vibrates in a state in which the workpieces 1 are immersed in the cleaning solution 13. The second vibrating body 12 is, for example, an ultrasonic transducer. The second vibrating body 12 is provided in the cleaning tank 11. The second vibrating body 12 is provided on, for example, a bottom wall of the cleaning tank 11, but the second vibrating body 12 may be provided on a side wall of the cleaning tank 11 or at the other position.

The controller 50 causes the first vibrating bodies 30 provided at the workpieces 1 and the second vibrating body 12 to vibrate. The controller 50 comprises signal generators 51 and 52 in the example shown in FIG. 1. The signal generator 51 is electrically connected to the first vibrating bodies 30, and the signal generator 52 is electrically connected to the second vibrating body 12.

The signal generator 51 outputs control signals (excitation signals) to the first vibrating bodies 30, and the signal generator 52 outputs a control signal (excitation signal) to the second vibrating body 12. As a result, the first vibrating bodies 30 vibrate by the signal generator 51 and the second vibrating body 12 vibrates by the signal generator 52. Incidentally, the controller 50 may further include a computer or the like to control the signal generators 51 and 52.

Figure 2:
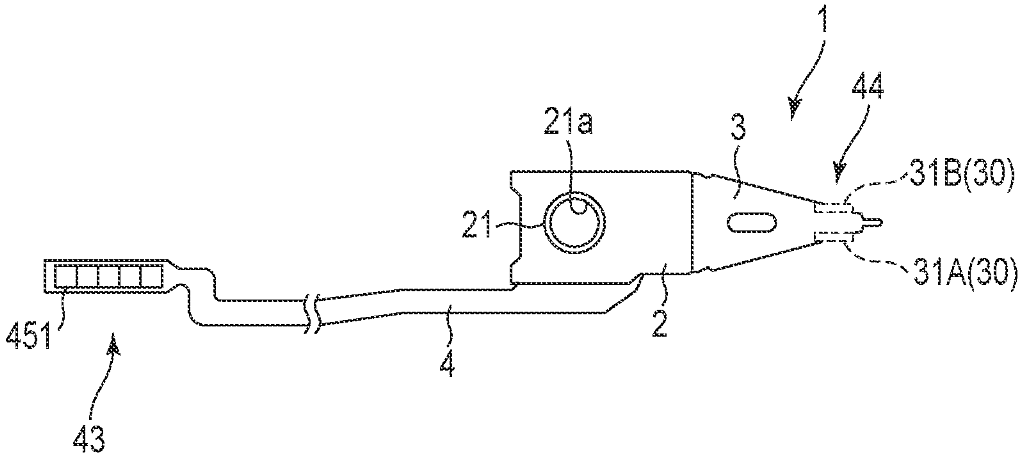
FIG. 2 is a schematic plan view showing a disk drive suspension which is an example of a workpiece.
Figure 3:
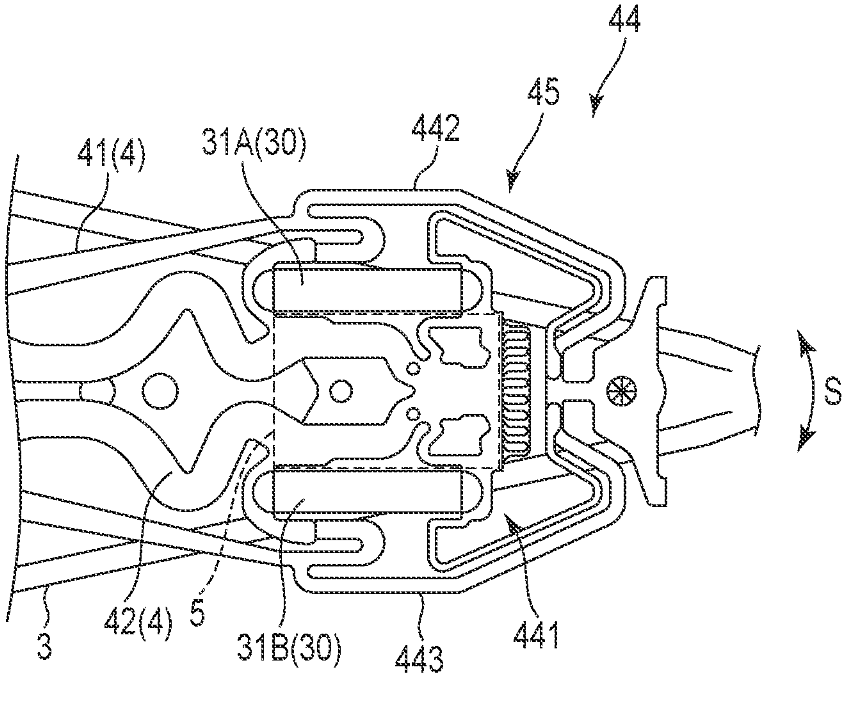
FIG. 3 is a schematic plan view showing a vicinity of a distal end portion of the workpiece shown in FIG. 2.

The disk drive suspension, which is an example of the workpiece 1, will be described. FIG. 2 is a schematic plan view showing the disk drive suspension which is an example of the workpiece 1. FIG. 3 is a schematic plan view showing a vicinity of a distal end portion of the workpiece 1 shown in FIG. 2.

The workpiece 1 has a thin and elongated shape (plate). The workpiece 1 comprises a base plate 2, a load beam 3, and a flexure 4. The base plate 2 is formed of, for example, a metallic material such as stainless steel.

The base plate 2 includes a boss portion 21. The base plate 2 is fixed to a carriage arm of the hard disk drive via the boss portion 21. The boss portion 21 includes a through hole 21*a* that penetrates the base plate 2. The through hole 21*a* has, for example, a circular shape.

The load beam 3 is formed of a metallic material such as stainless steel. The load beam 3 is tapered toward a distal end (right side in FIG. 2). For example, the load beam 3 is connected to the base plate 2 by spot welding using a laser.

The flexure 4 is provided along the base plate 2 and the load beam 3. The flexure 4 is fixed to the base plate 2 and the load beam 3 by, for example, spot welding using a laser. The flexure 4 includes a metal base 41 and a wiring portion 42 provided along the metal base 41 as shown in FIG. 3. The metal base 41 is formed by, for example, a thin stainless steel plate.

The flexure 4 further includes a tail portion 43 extending toward the rear side of the base plate 2 (left side in FIG. 2) and a distal end portion 44 that overlaps with the load beam 3. The distal end portion 44 corresponds to the distal end portion of the workpiece 1. The wiring portion 42 is formed from the tail portion 43 to the distal end portion 44.

The wiring portion 42 further includes a wiring terminal 451 at the end of the tail portion 43. The wiring terminal 451 is electrically connected to the controller 50. When the wiring terminal 451 is exposed to the cleaning solution 13 (shown in FIG. 1), the cleaning solution 13 is desirably a liquid having low conductivity (for example, pure water).

The flexure 4 further includes a tongue portion 441 and a pair of outriggers 442 and 443 at the distal end portion 44. A slider 5 is mounted on the tongue portion 441. For example, the slider 5 is not mounted on the workpiece 1.

In FIG. 3, the position where the slider 5 is mounted is represented by a dashed line. The wiring portion 42 is electrically connected to an element of the slider 5 via a terminal. Accessing data such as writing data to the disk or reading data from the disk is performed by these elements.

The pair of outriggers 442 and 443 are arranged on both sides of the tongue portion 441, respectively. The pair of outriggers are shaped to extend outward from both sides of the tongue portion 441. Each of the tongue portion 441 and the pair of outriggers 442 and 443 is a part of the metal base 41 and an outline of each of them is formed by, for example, etching. A gimbal portion 45 is constituted by the tongue portion 441, the pair of outriggers 442 and 443, and the like.

The workpiece 1 comprises piezoelectric elements 31A and 31B. In the present embodiment, the piezoelectric elements 31A and 31B are examples of the first vibrating bodies 30. The piezoelectric elements 31A and 31B are arranged at the distal end portion of the workpiece 1. More specifically, the piezoelectric elements 31A and 31B are arranged on both sides of the slider 5 in the example shown in FIG. 3.

The piezoelectric elements 31A and 31B are electrically connected to the wiring portion 42 of the flexure 4 via a conductive adhesive. The piezoelectric elements 31A and 31B are thereby electrically connected to the wiring terminal 451.

The piezoelectric elements 31A and 31B are formed of a piezoelectric body such as lead zirconate titanate (PZT). When a voltage is applied to the piezoelectric elements 31A and 31B, the piezoelectric body extends and contracts due to the piezoelectric effect and the elements 31A and 31B thereby vibrate. Based on this vibration, the piezoelectric elements 31A and 31B rotate the tongue portion 441 in a sway direction S (shown in FIG. 3).

Figure 4:
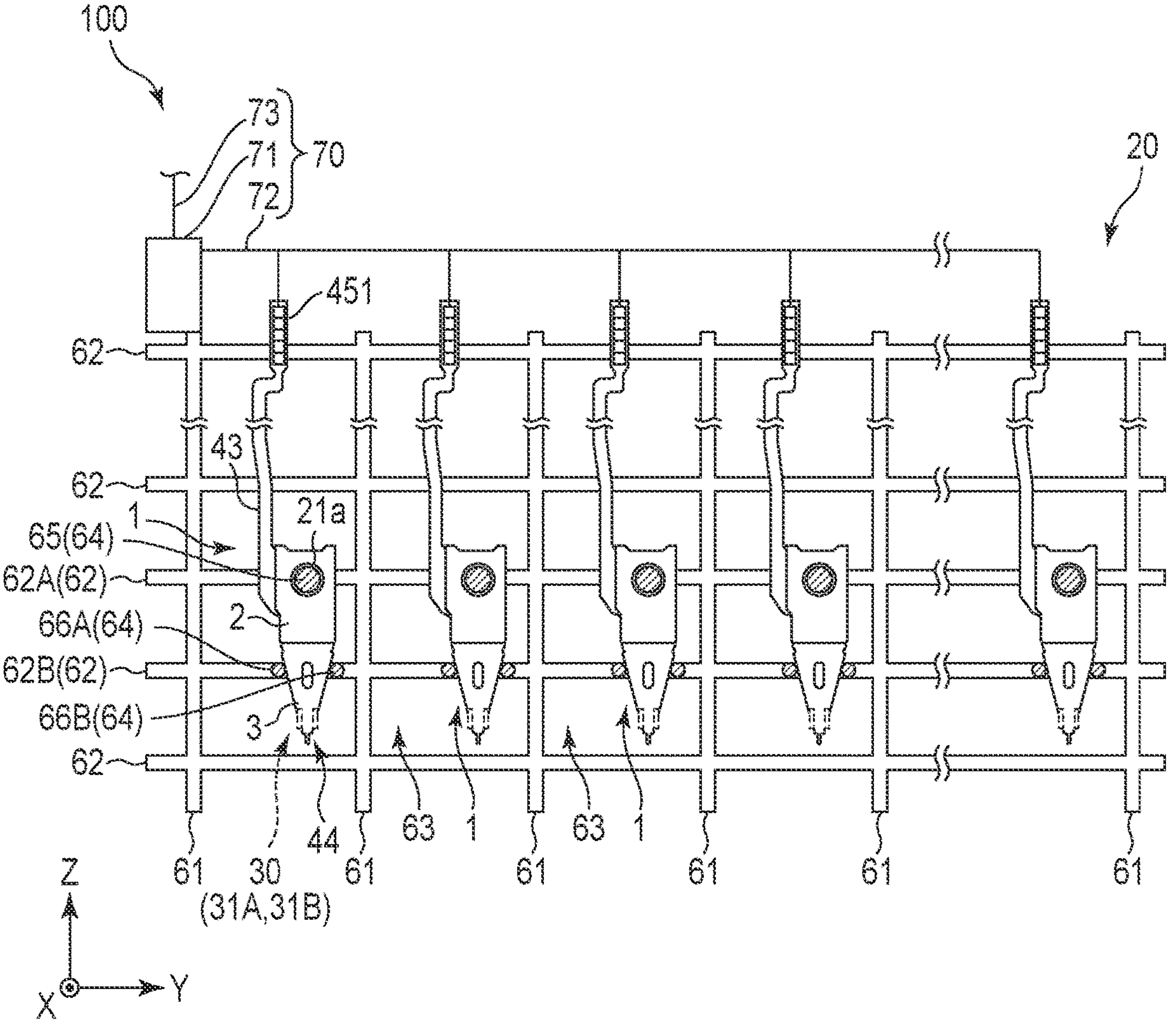
FIG. 4 is a view showing a holding member and a plurality of workpieces held by the holding member.

FIG. 4 is a view showing the holding member 20 and a plurality of workpieces 1 held by the holding member 20. FIG. 4 shows one of the plurality of holding members 20 shown in FIG. 1. In FIG. 4, the holding members 20 provided in the cleaning tank 11 are viewed in a direction opposite to the direction X.

The plurality of workpieces 1 are arranged at predetermined intervals in the direction Y, in the holding member 20. The workpieces 1 are held to extend in the direction Z in the example shown in FIG. 4. The distal end portions of the workpieces 1 face downward. More specifically, the distal end portions 44 of the flexures 4 are positioned to be lower than the tail portions 43 of the flexures 4 in a state in which the workpieces 1 are immersed in the cleaning solution 13.

The holding member 20 includes a plurality of vertical members 61 and a plurality of horizontal members 62. The vertical members 61 and the horizontal members 62 are formed of, for example, a resin material, but may also be formed of other materials such as a metal material. The plurality of longitudinal members 61 and the plurality of horizontal members 62 are formed integrally, for example, but are not limited to this example.

The plurality of vertical members 61 extend in the direction Z and are spaced apart at intervals in the direction Y. The plurality of horizontal members 62 extend in the direction Y and are spaced apart at intervals in the direction Z. These intervals are changed accordingly depending on the size of the workpieces 1 and the like.

For example, the holding member 20 is formed in a mesh-like pattern by the plurality of vertical members 61 and the plurality of horizontal members 62. In other words, the holding member 20 includes a plurality of openings 63. For example, the plurality of openings 63 are arrayed in a matrix in the direction Y and the direction Z. The openings 63 have, for example, a rectangular shape, but are not limited to this example. The cleaning solution 13 can pass through the plurality of openings 63.

For example, the workpiece 1 is located between the vertical members 61 in the direction Y. The plurality of horizontal members 62 are located to overlap with, for example, the base plates 2, the load beams 3, the tail portions 43 of the flexures 4, and the wiring terminals 451 of the tail portions 43, in the direction X.

The holding member 20 may further comprise a positioning member 64. The positioning member 64 positions the workpiece 1 at a predetermined position of the holding member 20. In FIG. 4, the positioning member 64 is marked with hatch lines. The positioning member 64 includes, for example, a first member 65 and a pair of second members 66A and 66B.

The first member 65 is provided on a horizontal member 62A to project from the horizontal member 62A in the direction X. The horizontal member 62A is the horizontal member 62 that overlaps with the base plate 2 in the direction X, among the plurality of horizontal members 62. A cross-sectional shape of the first member 65 is, for example, a circular shape, but is not limited to this example. The first member 65 is passed through a through hole 21*a* in the boss portion 21 of the workpiece 1.

The pair of second members 66A and 66B are provided on a horizontal member 62B to project from the horizontal member 62B in the direction X. The horizontal member 62B is the horizontal member 62 that overlaps with the load beam 3 in the direction X, among the plurality of horizontal members 62. A cross-sectional shape of the second members 66A and 66B is, for example, a circular shape, but is not limited to this example.

The load beam 3 is located between the second members 66A and 66B in the direction Y. In other words, the pair of second members 66A and 66B are located on both sides of the load beam 3.

The workpiece 1 is stably held on the holding member 20 by the first member 65 and the pair of second members 66A and 66B. Furthermore, the workpiece 1 is less likely to be deformed during the cleaning process by holding the workpiece 1 to extend in the direction Z.

Incidentally, the shapes of the first member 65 and the pair of second members 66A and 66B are mere examples and may be other shapes. The positioning member 64 may further include other members.

The cleaning device 100 further comprises a connecting member 70. The connecting member 70 electrically connects the controller 50 with the plurality of workpieces 1. In other words, the piezoelectric elements 31A and 31B of the plurality of workpieces 1 are electrically connected to the controller 50 via the connecting member 70 and the wiring portion 42 of the flexure 4.

The connecting member 70 includes, for example, a terminal block 71 and wires 72 and 73. The terminal block 71 is provided on, for example, the holding member 20. In one example, the terminal block 71 is provided on one of the vertical members 61, but may also be provided on the horizontal member 62. The wire 72 electrically connects the terminal block 71 with each of the wiring terminals 451 of the plurality of workpieces 1. The wire 73 electrically connects the terminal block 71 with the controller 50 (shown in FIG. 1).

Figure 5:
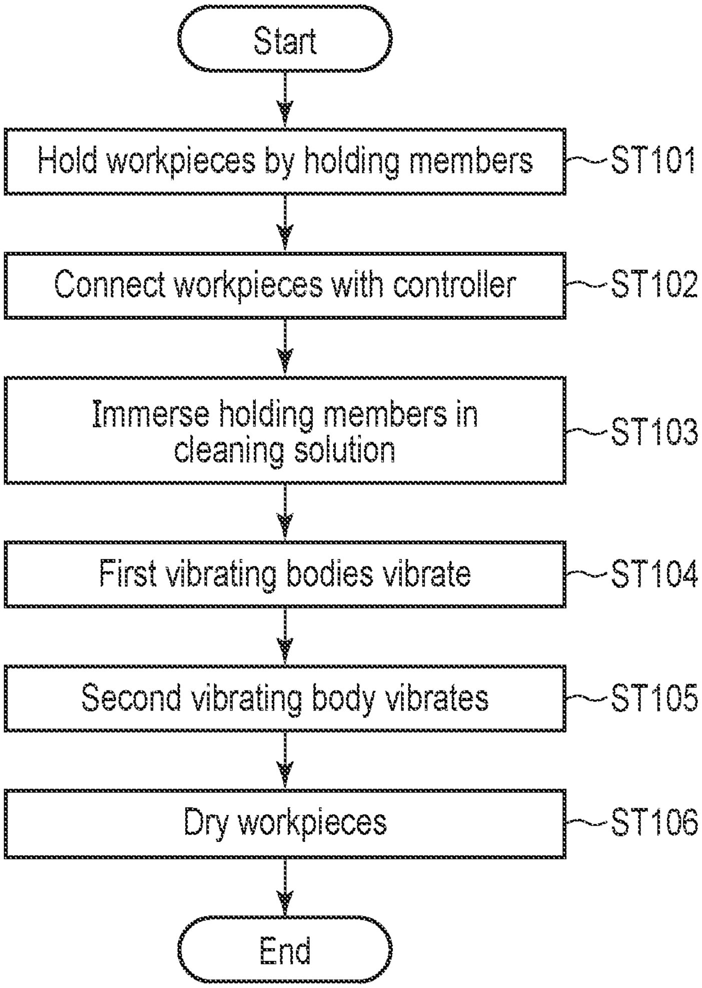
FIG. 5 is a flowchart showing an example of a cleaning process using a cleaning device according to an embodiment.

FIG. 5 is a flowchart showing an example of a cleaning process using the cleaning device 100 according to the present embodiment. The cleaning process is, for example, a part of the manufacturing process for manufacturing a product such as a disk drive suspension. The first vibrating bodies 30 are attached to predetermined positions on the workpieces 1 before process ST101. More specifically, the piezoelectric elements 31A and 31B are attached to the distal end portions of the workpieces 1.

First, in process ST101, a plurality of workpieces 1 are held by the holding member 20. The plurality of workpieces 1 are positioned at predetermined positions of the holding member 20 by, for example, the positioning members 64 (shown in FIG. 4).

Then, in process ST102, the workpieces 1 are electrically connected to the controller 50. More specifically, the wire 72 is connected to the wiring terminals 451 of the plurality of workpieces 1 and the terminal block 71, and the wire 73 is connected to the terminal block 71 and the controller 50. The first vibrating bodies 30 are thereby electrically connected to the controller 50.

Then, in process ST103, the plurality of holding members 20 are immersed in the cleaning solution 13. The plurality of workpieces 1 held by the holding members 20 are thereby immersed in the cleaning solution 13.

The plurality of holding members 20 may be arranged in the direction X in advance or may be arranged in the direction X inside the cleaning tank 11. The cleaning solution 13 may be contained in the cleaning tank 11 in advance or after the holding members 20 are arranged inside the cleaning tank 11.

Then, in process ST104, the first vibrating bodies 30 vibrate by the controller 50. At this time, the signal generator 51 of the controller 50 outputs control signals to cause the first vibrating bodies 30 to vibrate. As a result, the first vibrating bodies 30 vibrate and the workpieces 1 are washed.

Then, in process ST105, the second vibrating body 12 vibrates by the controller 50. At this time, the signal generator 52 of the controller 50 outputs a control signal to cause the second vibrating body 12 to vibrate. As a result, the second vibrating body 12 vibrates and the workpieces 1 are washed.

For example, the controller 50 causes the first vibrating bodies 30 and the second vibrating body 12 to vibrate simultaneously in the state in which the workpieces 1 are immersed in the cleaning solution 13. In process ST105, the controller 50 may or may not cause the first vibrating bodies 30 to vibrate. In processes ST104 and ST105, the plurality of holding members 20 may be moved inside the cleaning tank 11.

In processes ST104 and ST105, control signals corresponding to desired vibration are output from each of the signal generators 51 and 52 to the first vibrating bodies 30 and the second vibrating body 12. The vibration frequency, waveform, intensity, and the like for causing the first vibrating bodies 30 and the second vibrating body 12 to vibrate are selected according to the contamination of the workpieces 1. In this example, the contamination indicates particles, oil, and the like adhering to the workpieces 1.

The vibration frequency of the first vibrating bodies 30 is in a range from several kHz to several hundreds of kHz, in one example. The vibration frequency of the second vibrating body 12 is in a range from approximately 30 kHz to approximately 150 kHz, in one example. The first vibrating bodies 30 may vibrate with a vibration frequency different from the second vibrating body 12, in one example. The cleaning effect of the cleaning device 100 can be improved by cleaning the workpieces 1 with the vibration based on different vibration frequencies. The first vibrating bodies 30 may vibrate with a vibration frequency equal to the second vibrating body 12 in the other example.

From the viewpoint of the vibration frequency, a lower vibration frequency has stronger cleaning power and is therefore more suitable for cleaning large contaminants, while a higher vibration frequency has weaker cleaning power and is therefore more suitable for cleaning fine contaminants.

For example, the vibration frequency of the first vibrating bodies 30 may be greater than that of the second vibrating body 12. Therefore, large contaminants of the entire workpieces 1 can be removed and fine contaminants around the first vibrating bodies 30 (piezoelectric elements 31A and 31B) can also be removed.

For example, the vibration frequency of the first vibrating bodies 30 may be smaller than that of the second vibrating body 12. Therefore, the workpieces 1 can be cleaned while suppressing damage to the workpieces 1 and the surrounding of the first vibrating bodies 30 can also be cleaned sufficiently. In addition, the vibration frequencies can also be changed according to the output.

The vibration waveform is, for example, a sine wave, a square wave, a sawtooth wave, and the like. For example, the first vibrating bodies 30 may vibrate with a vibration waveform different from or the same vibration waveform as that of the second vibrating body 12. The vibration frequency may be changed, for example, by a sine sweep or randomly. For example, the workpieces 1 can be cleaned while covering the vibration frequency effective for the contamination of the workpieces 1, by changing the vibration frequency by a sine sweep.

Then, in process ST106, the plurality of holding members 20 are removed from the cleaning tank 11 and the workpieces 1 are dried. In process ST106, the workpieces 1 may be dried by natural drying or by applying heat to the workpieces 1 from the outside. Deformation of the workpieces 1 can be suppressed by these drying methods. After that, the workpieces 1 are subjected to a process of attaching the sliders 5 (shown in FIG. 3) to the workpieces 1, and the disk drive suspension is completed.

According to the cleaning method of the workpieces 1 and the cleaning device 100, as configured as described above, the quality of cleaning can be improved. More specifically, the cleaning method according to the present embodiment immerses the workpieces 1 in the cleaning solution 13, and causes the first vibrating bodies 30 to vibrate by the signal generator 51 of the controller 50 to clean the workpieces 1. The cleaning device 100 according to the present embodiment comprises the cleaning tank 11 in which the cleaning solution 13 is contained, and a controller 50 electrically connected to the first vibrating bodies 30.

In the present embodiment, the workpieces 1 vibrate by vibrating the first vibrating bodies 30, and the workpieces 1 are thereby cleaned. Therefore, the workpieces 1 can be cleaned while suppressing the influence of the positions of the workpieces 1 inside the cleaning tank 11, the holding members, and the like when the workpieces 1 are cleaned. As a result, the quality of cleaning can be improved.

As a comparative example, for example, there is a cleaning device comprising an ultrasonic transducer and a cleaning tank in which the ultrasonic transducer is installed. The cleaning device according to the comparative example cleans a cleaned member immersed in the cleaning solution by causing the ultrasonic transducer to vibrate.

When a plurality of (for example, a chain of) cleaned members are cleaned by the cleaning device according to the comparative example, the degree of cleaning for each cleaned member tends to be different due to the position inside the cleaning tank, the holding members for holding the cleaned members, and the like. In order to reliably clean a plurality of cleaned members, for example, the intensity of the vibration generated by the ultrasonic transducer needs to be increased. This may cause deformation or damage to the cleaned members.

In contrast to the cleaning device according to the comparative example, the cleaning method and the cleaning device 100 according to the present embodiment can cause the workpieces 1 to vibrate by causing the first vibrating bodies 30 provided on the workpieces 1 to vibrate. Therefore, even when a plurality of workpieces 1 are cleaned, cleaning is less likely to be affected by the positions of the workpieces 1 inside the cleaning tank. As a result, the difference in degree of cleaning is less likely to be made for each of the workpieces 1. As a result, the quality of cleaning in a case of cleaning a plurality of workpieces 1 can be improved.

Since the difference in degree of cleaning is less likely to be made for each of the workpieces 1, the intensity of vibration does not need to be increased more than necessary. Therefore, deformation of the workpieces 1 and the like can be suppressed. In other words, the vibration of the first vibrating bodies 30 can be adjusted in accordance with the contamination of the workpieces 1.

When the number of workpieces 1 to be cleaned is small, efficient cleaning can be performed with less power consumption as compared to the cleaning device according to the comparative example.

As described with reference to FIG. 2 and FIG. 3, when the piezoelectric elements 31A and 31B, which are the first vibrating bodies 30, are mounted on the distal end portion of the workpiece 1, the vicinity of the distal end portion of the workpiece 1 can be cleaned intensively by causing the piezoelectric elements 31A and 31B to vibrate. Even when contaminants such as particles are attached to the piezoelectric elements 31A and 31B themselves, the contaminants can easily drop out since the piezoelectric elements 31A and 31B vibrate.

Figure 6:
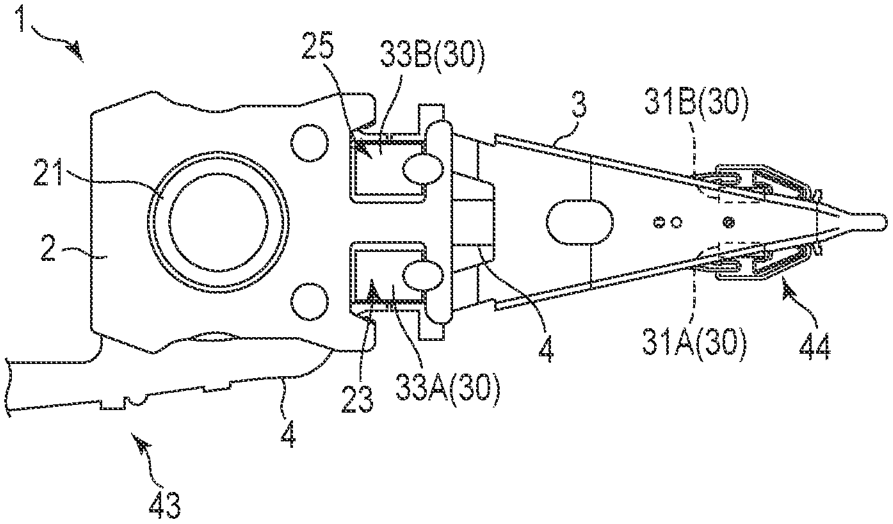
FIG. 6 is a schematic plan view showing a disk drive suspension as another example of the workpiece.

The piezoelectric elements mounted on workpiece 1 are not limited to this example. FIG. 6 is a schematic plan view showing a disk drive suspension as another example of the workpiece 1.

The workpiece 1 further comprises piezoelectric elements 33A and 33B. The piezoelectric elements 33A and 33B are other examples of the first vibrating bodies 30. The base plate 2 includes openings 23 and 25 in the example shown in FIG. 6. The openings 23 and 25 constitute mounting portions of the piezoelectric elements 33A and 33B.

The piezoelectric elements 33A and 33B are provided in the openings 23 and 25, respectively. The piezoelectric elements 33A and 33B are electrically connected to the wiring portion 42 of the flexure 4. In the example shown in FIG. 6, the vicinity of the base plate 2 can be cleaned intensively by causing the piezoelectric elements 33A and 33B to vibrate.

Since the workpiece 1 shown in FIG. 6 comprises the piezoelectric elements 31A and 31B and the piezoelectric elements 33A and 33B, the vicinity of the distal end portion of the workpiece 1 can be cleaned intensively and the vicinity of the base plate 2 can be cleaned intensively, by the controller 50. Thus, since the piezoelectric elements 31A, 31B, 33A, and 33B are caused to vibrate accordingly by the controller 50, the position to be cleaned intensively can be selected.

In the present embodiment, the cleaning device 100 further comprises a connecting member 70 that electrically connects the controller 50 with the first vibrating body 30. More specifically, the connecting member 70 includes, for example, a terminal block 71 and wires 72 and 73. For example, since the controller 50 and the wiring terminal 451 do not need to be connected by connecting the terminal block 71 with the wiring terminal 451 of the workpiece 1 by the wire 72, workability in the cleaning process can be improved.

In the present embodiment, the cleaning device 100 further comprises a second vibrating body 12. Therefore, the second vibrating body 12 can be caused to vibrate in the cleaning process. The vibration of the second vibrating body 12 can supplement the cleaning power of the cleaning device 100. As a result, the cleaning quality of the cleaning device 100 can be further improved.

The holding member 20 may hold a plurality of workpieces 1 in a chain, which are connected by a frame. For example, since the wiring terminals 451 of the workpieces 1 are aligned regularly in the direction Y, the wire 72 can easily be connected to the wiring terminals 451 of the plurality of workpieces 1. In other words, workability in the cleaning process can be improved. In addition to the above-described effects, various desirable effects can be obtained from the present embodiment.

Figure 7:
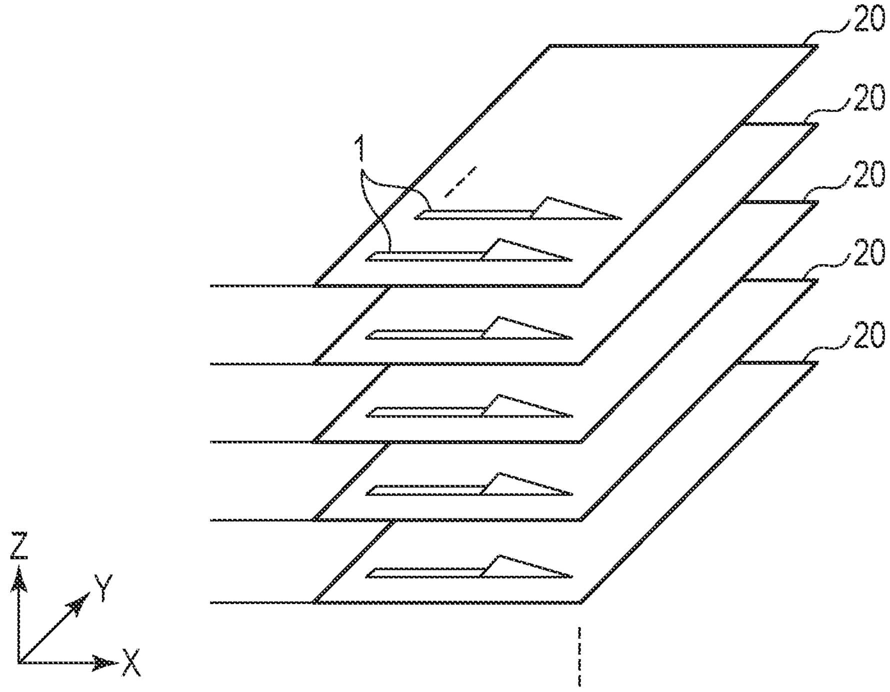
FIG. 7 is a schematic perspective view showing another example of an alignment direction of holding members.

In the present embodiment, an example in which a plurality of holding members 20 are aligned in the direction X is disclosed, but the direction of alignment of the plurality of holding members 20 is not limited to this example. FIG. 7 is a schematic perspective view showing another example of an alignment direction of holding members 20. The plurality of holding members 20 may be aligned in the direction Z as shown in FIG. 7. In other words, the plurality of holding members 20 may be stacked in the direction Z.

Figure 8:
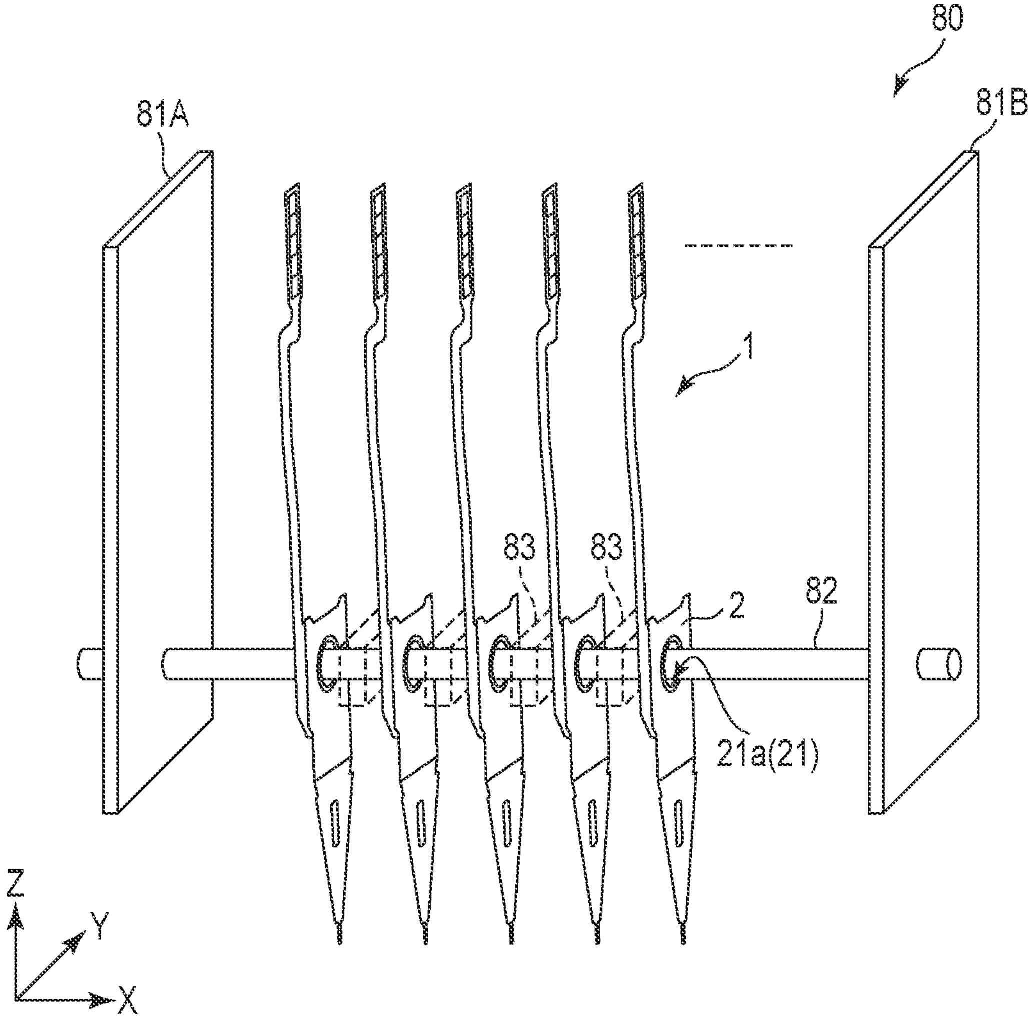
FIG. 8 is a schematic perspective view showing another example of the holding member.

The holding members holding the workpieces 1 are not limited to the above-described examples. FIG. 8 is a schematic perspective view showing another example of the holding member.

A holding member 80 comprises plate members 81A and 81B and a positioning member 82. The holding member 80 may be formed of metal material or resin material. The plate members 81A and 81B have, for example, a flat plate shape. The plate member 81A faces the plate member 81B in the direction X. The positioning member 82 connects the plate member 81A with the plate member 81B. The positioning member 82 has, for example, a columnar shape.

In the example shown in FIG. 8, a plurality of workpieces 1 are aligned between the plate members 81A and 81B. The plurality of workpieces 1 are arranged to extend in the direction Z. The positioning member 82 is passed through holes 21*a* in the base plates 2 of the plurality of workpieces 1.

The holding member 80 may further include a plurality of spacers 83. For example, the spacers 83 are provided between the workpieces 1. The plurality of spacers 83 can suppress contact between the workpieces 1. A plurality of holding members 80 may be provided in the cleaning tank 11.

Incidentally, in the present embodiment, the disk drive suspension is disclosed as an example of the workpiece 1, but may be applied to the other type of workpieces (cleaned members) comprising vibrating bodies. In the present embodiment, the example in which the cleaning device 100 comprises a plurality of holding members 20 is disclosed, but the cleaning device 100 may comprise one holding member 20.

In the present embodiment, the example of performing process ST105 after process ST104 is disclosed, but process ST104 may be performed after process ST105. In the present embodiment, the example in which the cleaning device 100 comprises the second vibrating body 12 is disclosed, but the cleaning device 100 may not comprise the second vibrating body 12. In this case, the workpieces 1 are cleaned by the vibration of the first vibrating bodies 30.

The cleaning device 100 may comprise a plurality of cleaning tanks 11. In this case, each of process ST103 to process ST105 described with reference to FIG. 5 may be repeated in the plurality of cleaning tanks 11. Therefore, the cleaning device 100 can perform multi-stage cleaning by the plurality of cleaning tanks 11.

The cleaning device 100 may further comprise a vibrating body. One vibrating body or two or more vibrating bodies may be provided. For example, the vibrating body is provided at any location in the cleaning tank 11. The workpiece 1 may comprise even more vibrating bodies than those in the disclosed example. Any of the vibrating bodies provided on the workpieces 1 can be used to clean the workpieces 1.

In implementing the invention disclosed in the above embodiment, the specific aspect of each element constituting the disk drive suspension and the cleaning device can be variously changed as well as the specific aspect of shapes of the base plate, the load beam, the flexure, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cleaning method of cleaning a workpiece comprising a first vibrating body, the method comprising:

attaching the first vibrating body to the workpiece via an adhesive;

electrically connecting the first vibrating body with a controller;

immersing the workpiece in a cleaning solution; and cleaning the workpiece by causing the first vibrating body to vibrate by the controller after immersing the workpiece in the cleaning solution, wherein:

the workpiece is a disk drive suspension, the first vibrating body is a piezoelectric element provided on the disk drive suspension, the disk drive suspension further comprises a base plate, a load beam connected to the base plate, and a flexure provided along the load beam, the flexure includes a tail portion including a wiring terminal electrically connected to the controller, and a distal end portion on which a slider is mounted, and the distal end portion is located below the tail portion in a state in which the disk drive suspension is entirely immersed in the cleaning solution.

2. The cleaning method of claim 1, further comprising:

holding a plurality of workpieces with holding members.

3. The cleaning method of claim 1, further comprising:

cleaning the workpiece by causing a second vibrating body provided in a cleaning tank to vibrate after immersing the workpiece in the cleaning solution.

4. The cleaning method of claim 3, wherein the first vibrating body and the second vibrating body are caused to vibrate simultaneously to clean the workpiece.

5. The cleaning method of claim 3, wherein a vibration frequency of the first vibrating body is different from a vibration frequency of the second vibrating body.

* * * * *